US009730860B2

(12) United States Patent
Hamilton

(10) Patent No.: US 9,730,860 B2
(45) Date of Patent: Aug. 15, 2017

(54) PILL DISPENSING ASSEMBLY

(75) Inventor: Joseph Bruce Hamilton, Dunn, NC (US)

(73) Assignee: PSCAP, LLC, Dunn, NC (US)

( * ) Notice: Subject to any disclaimer, the term of this patent is extended or adjusted under 35 U.S.C. 154(b) by 0 days.

(21) Appl. No.: 13/430,239

(22) Filed: Mar. 26, 2012

(65) Prior Publication Data

US 2013/0116818 A1 May 9, 2013

Related U.S. Application Data

(60) Provisional application No. 61/585,344, filed on Jan. 11, 2012, provisional application No. 61/570,384, filed on Dec. 14, 2011, provisional application No. 61/564,598, filed on Nov. 29, 2011, provisional application No. 61/556,609, filed on Nov. 7, 2011, provisional application No. 61/555,341, filed on Nov. 3, 2011.

(51) Int. Cl.
*G06F 17/00* (2006.01)
*B65G 59/00* (2006.01)
*A61J 1/03* (2006.01)
*A61J 7/04* (2006.01)

(52) U.S. Cl.
CPC ................ *A61J 7/04* (2013.01); *A61J 7/0418* (2015.05)

(58) Field of Classification Search
CPC .................................. A61J 7/04; A61J 7/0418
USPC .................................................. 700/236–237
See application file for complete search history.

(56) References Cited

U.S. PATENT DOCUMENTS

| | | | | | |
|---|---|---|---|---|---|
| 3,241,712 | A | * | 3/1966 | Sacchetti | B65D 83/0409 221/265 |
| 3,991,908 | A | * | 11/1976 | Thomas | B65D 83/0409 215/218 |
| 4,150,766 | A | * | 4/1979 | Westendorf et al. | 221/112 |
| 4,273,254 | A | * | 6/1981 | Cuppleditch | B65D 83/0409 221/196 |
| 4,405,060 | A | * | 9/1983 | Hsei | B65D 83/0409 221/135 |
| 4,460,106 | A | * | 7/1984 | Moulding et al. | 221/1 |
| 4,504,153 | A | | 3/1985 | Schollmeyer et al. | |
| 4,523,694 | A | * | 6/1985 | Veltri | 221/265 |
| 4,613,057 | A | * | 9/1986 | Sacchetti | B65D 83/0409 221/265 |
| 4,721,228 | A | * | 1/1988 | Bejerano | B23P 19/003 221/13 |
| 4,939,705 | A | * | 7/1990 | Hamilton et al. | 368/10 |

(Continued)

*Primary Examiner* — Michael K Collins

(57) ABSTRACT

A pill dispensing assembly for dispensing a pill from a pill bottle includes a first layer having a pill exit passage. A second layer is operatively connected to the first layer, and includes a pill entry passage horizontally offset from the exit passage. A pill dispensing layer is positioned between the first and second layers, is movable with respect to the first and second layers, and includes a holding chamber sized to receive the pill. The holding chamber is horizontally movable from a first loading position in which the holding chamber is aligned with the entry passage and is horizontally offset from the exit passage to receive the pill, to a second dispensing position in which the holding chamber is aligned with the exit passage and is horizontally offset from the entry passage to dispense the pill through the exit passage. Pill dispensing may be timed or time monitored.

15 Claims, 13 Drawing Sheets

(56) References Cited

U.S. PATENT DOCUMENTS

| | | | | |
|---|---|---|---|---|
| 5,323,929 | A * | 6/1994 | Marlar | A61J 7/0481 221/121 |
| 5,392,952 | A * | 2/1995 | Bowden | 221/15 |
| 5,495,961 | A * | 3/1996 | Maestre | 221/3 |
| 5,852,590 | A * | 12/1998 | de la Huerga | A61J 7/0481 368/10 |
| 6,021,918 | A * | 2/2000 | Dumont et al. | 221/2 |
| 6,234,343 | B1 * | 5/2001 | Papp | 221/7 |
| 6,302,295 | B1 | 10/2001 | Weisman | |
| 6,497,342 | B2 * | 12/2002 | Zhang et al. | 221/265 |
| 6,545,592 | B2 * | 4/2003 | Weiner | 368/10 |
| 6,604,650 | B2 | 8/2003 | Sagar | |
| 6,771,174 | B2 | 8/2004 | Broas | |
| 7,073,209 | B1 * | 7/2006 | McCormick | E03D 9/033 4/227.1 |
| 7,081,807 | B2 | 7/2006 | Lai | |
| 7,269,476 | B2 | 9/2007 | Ratnakar | |
| 7,295,890 | B2 | 11/2007 | Jean-Pierre | |
| 7,661,384 | B2 | 2/2010 | Mataya | |
| 7,735,683 | B2 * | 6/2010 | Handfield | A61J 7/0084 221/241 |
| 7,844,361 | B2 | 11/2010 | Jean-Pierre | |
| 7,907,477 | B2 | 3/2011 | Puzia | |
| 7,978,564 | B2 * | 7/2011 | De La Huerga | A61M 5/14212 221/15 |
| 2003/0086338 | A1 | 5/2003 | Sastry et al. | |
| 2005/0269348 | A1 * | 12/2005 | Limback | A47L 15/4409 221/263 |
| 2008/0117719 | A1 * | 5/2008 | Hildebrandt | A61J 7/0472 368/10 |
| 2011/0052310 | A1 * | 3/2011 | Jansen et al. | 402/4 |
| 2011/0133948 | A1 | 6/2011 | Ervin | |

* cited by examiner

"LOCKED POSITION"

"UNLOCKED POSITION"

PILL DISPENSING ASSEMBLY

RELATED APPLICATIONS

This application claims priority from the following U.S. provisional patent applications: Application Ser. No. 61/555,341 filed on Nov. 3, 2011; Application Ser. No. 61/556,609 filed on Nov. 7, 2011; Application Ser. No. 61/564,598 filed on Nov. 29, 2011; Application Ser. No. 61/570,384 filed on Dec. 14, 2011; and Application Ser. No. 61/585,344 filed on Jan. 11, 2012. Each of these provisional applications is incorporated in its entirety by reference herein.

BACKGROUND

The present invention generally relates to medication dispensing, and particularly relates to a pill dispensing assembly for dispensing pills from a pill bottle.

Prescription drugs abuse has become an increasingly severe societal problem, and has in some instances surpassed abuse of more common street drugs. In particular, abuse of prescription painkillers has been problematic. Several states have already created prescription drug abuse databases to track the frequency with which individuals fill prescriptions for certain prescription medications, and even to track over the counter purchase of medications, such as pseudoephedrine, which are known to be used as ingredients in abused street drugs.

Although pharmacies can track how often prescriptions are filled, and can control an amount of pills given to a patient with dosing, they cannot ensure that the patient doesn't disregard a dosing schedule and ingest an excess quantity of pills at a given time. Pharmacies also cannot ensure that patients, caretakers or other people with access to patient medication do not divert prescription drugs for abuse or illegal sale.

Particularly in cases where patients have known history of abusing narcotics, it is desirable to prevent those patients from engaging in prescription drug abuse. To date, pharmacies have relied on "childproof" bottle caps and other cap designs to prevent inappropriate access to medication. However these caps do not control/monitor individual pill dispensing, and therefore do not effectively address any of the issues discussed above.

SUMMARY

A plurality of pill dispensing assemblies for controlling and/or monitoring the dispensing of pills from a pill container are disclosed. According to one embodiment, a pill dispensing assembly for dispensing a pill from a pill bottle includes a first layer that includes a pill exit passage. A second layer is operatively connected to the first layer, and includes a pill entry passage that is horizontally offset from the exit passage. A pill dispensing layer is positioned between the first and second layers, is movable with respect to the first and second layers, and includes a holding chamber sized to receive the pill. The holding chamber is horizontally movable from a first loading position in which the holding chamber is aligned with the entry passage and is horizontally offset from the exit passage to receive the pill, to a second dispensing position in which the holding chamber is aligned with the exit passage and is horizontally offset from the entry passage to dispense the pill through the exit passage.

In the same or another embodiment, a pill dispensing assembly for dispensing a pill from a pill bottle includes a first layer including a pill exit passage, and a second layer operatively connected to the first layer. The second layer comprising a pill entry passage that is horizontally offset from the exit passage. A pill dispensing layer is positioned between the first and second layers. A longitudinal axis extends through the first layer, second layer, and pill dispensing layer, and the entry and exit passages are radially offset from each other. A holding chamber within the pill dispensing layer is radially movable from a first loading position in which the holding chamber is aligned with the entry passage and is radially offset from the exit passage to receive a pill, to a second dispensing position in which the holding chamber is aligned with the exit passage and is radially offset from the entry passage to dispense the pill through the exit passage.

According to another exemplary embodiment, a pill dispensing assembly for dispensing a pill from a pill bottle comprises a first layer including a pill exit passage. A pill dispensing layer is axially aligned with and rotatable with respect to the first layer. A first side of the pill dispensing layer faces the first layer, and an opposite second side of the pill dispensing layer faces a pill storage area. The pill dispensing layer includes a holding chamber sized to receive a pill from the storage area. A driveshaft is configured to rotate the pill dispensing layer from a loading position in which the holding chamber is exposed to the storage area to receive the pill from the storage area, to a dispensing position in which the holding chamber is aligned with the exit passage to dispense the pill through the exit passage. A timer is configured to control rotation of the pill dispensing layer between the loading and dispensing position.

According to another exemplary embodiment, a device to control dispensing of a pill from a pill container includes a pill dispensing passage that extends through the device along a first axis and includes an inlet area and an opposing outlet area that are aligned along the first axis. A catch member extends at least partially into the inlet area of the pill dispensing passage from a first side, and is rotatable about a second axis that is transverse to the first axis. A contact member is biased into the inlet area of the pill dispensing passage from an opposing second side. An elongated plunger is spaced away from the passage, and includes a first plurality of teeth sized to engage a second plurality of teeth on the catch member to effect rotation of the catch member about the second axis, such that depression of the plunger in a first direction engages a pill between the catch member and the contact member and advances the pill from the inlet area to the outlet area in an opposite second direction.

In these devices, a controller may be used to record timing information related to pill dispensing, and to restrict dispensing of pills to predefined dosage times. Thus, pill dispensing may be timed or time monitored.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
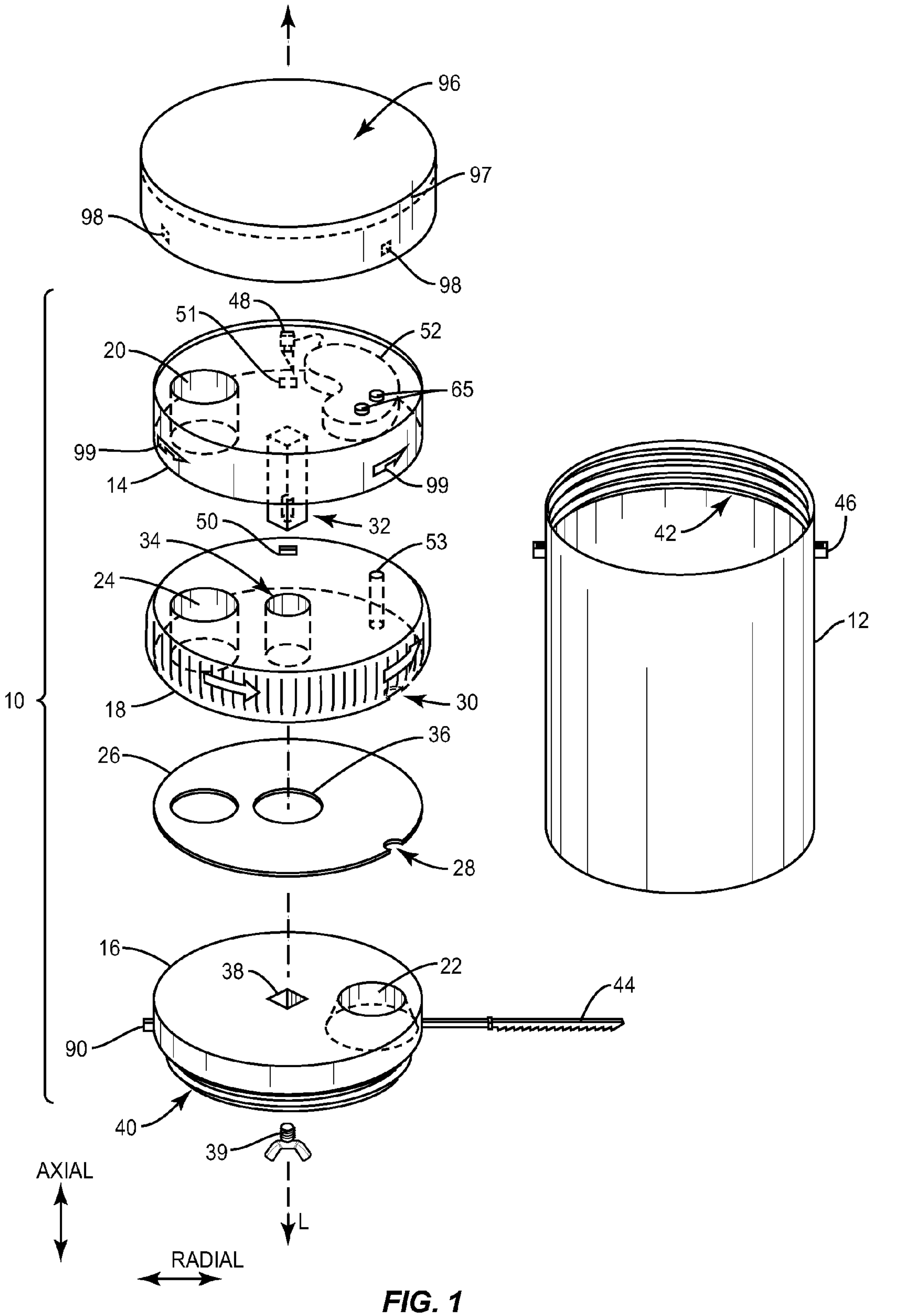
FIG. 1 illustrates an exploded view of an example pill dispensing assembly for dispensing pills from a pill bottle.
Figure 2:
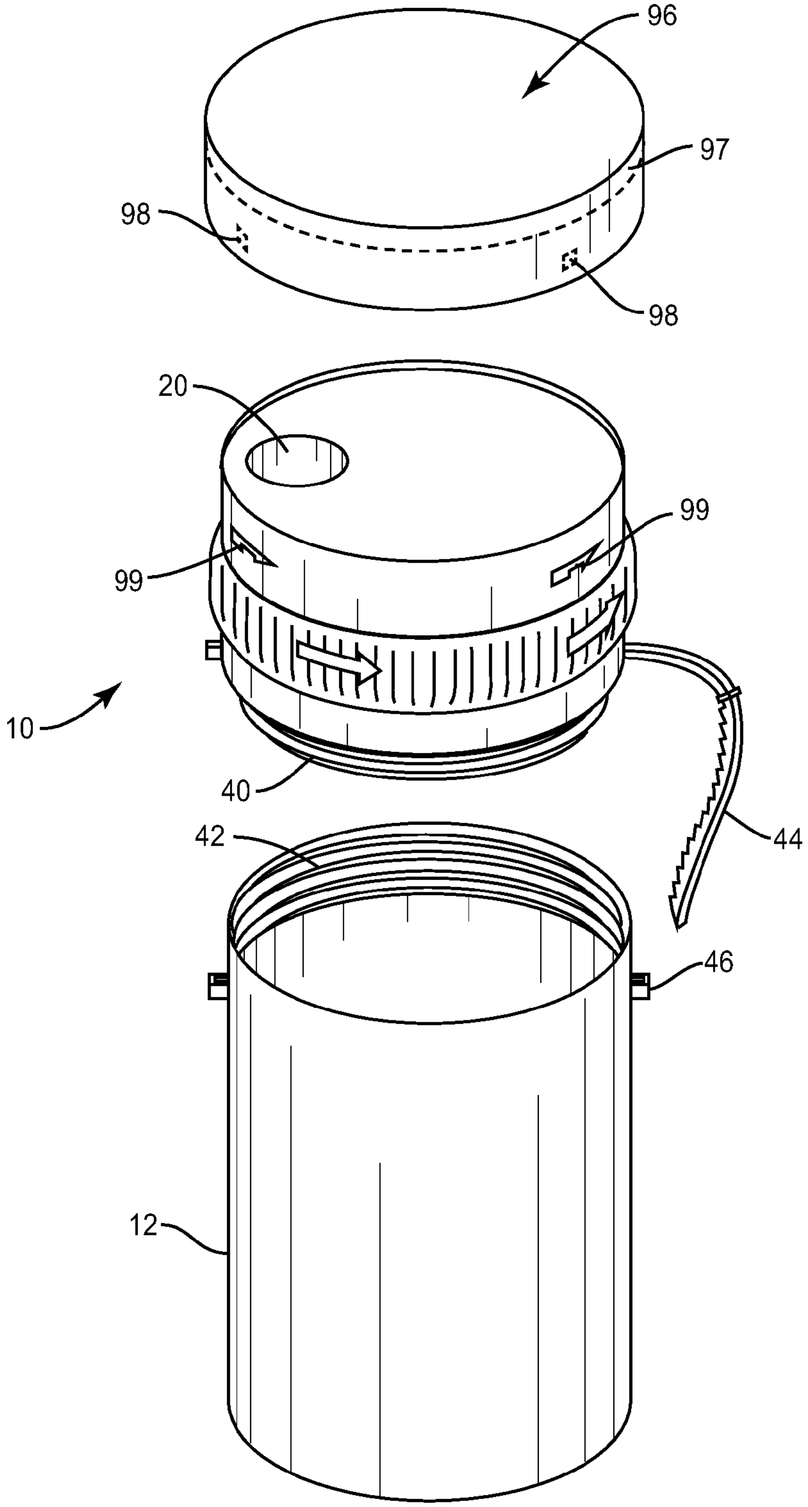
FIG. 2 illustrates an assembled view of the pill dispensing assembly of FIG. 1.

FIG. 1 illustrates an exploded view of a first example pill dispensing assembly 10 for dispensing a pill or "tablet" from a pill bottle 12, and FIG. 2 illustrates a corresponding assembled view of the assembly 10. The pills may include pharmaceutical solid dose, or gelatin capsules, for example. The assembly 10 includes a first layer 14, a second layer 16 and a pill dispensing layer 18. The first layer 14 includes a pill exit passage 20 through which a pill from the pill bottle 12 may exit the pill bottle 12 for patient consumption. The second layer 16 is operatively connected to the first layer 14, and includes a pill entry passage 22 that is horizontally and radially offset from the exit passage 20 with respect to a longitudinal axis L. The longitudinal axis L extends through the layers 14, 16, 18, and the layers 14, 16, 18 are coaxial with respect to the axis L. In one example, the pill entry passage 22 has a frustoconical shape to facilitate the entry of pills into the entry passage 22 with greater ease. Of course, this is only an example, and other pill entry passage 22 profiles could be used. The assembly 10 may be used as a cap for the pill bottle 10. Alternatively, a childproof bottle cap 96 including a flexible sealing diaphragm 97 may be secured to the assembly 10 via childproof lock pins 98 on the cap 96, and corresponding childproof lock members 99 on the first layer 14. The diaphragm 97 may act as a moisture seal. An exemplary diaphragm is illustrated in greater detail in a cross-sectional view of the example childproof cap of in FIG. 12. (see ref. numeral 397).

Figure 3A:
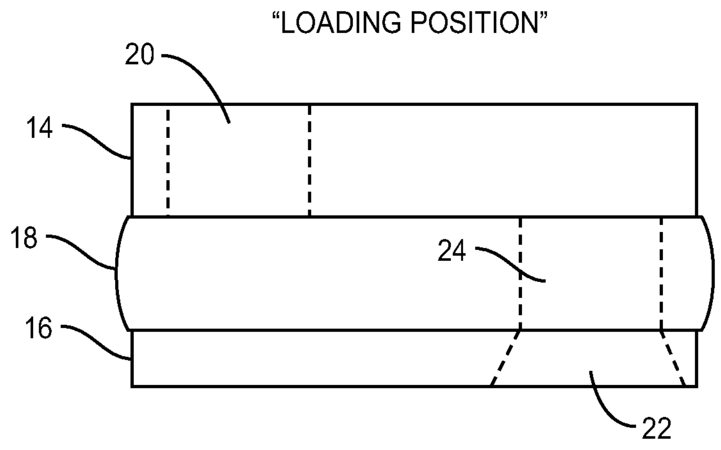
FIG. 3A illustrates a holding chamber of the assembly of FIG. 1 in a loading position.
Figure 3B:
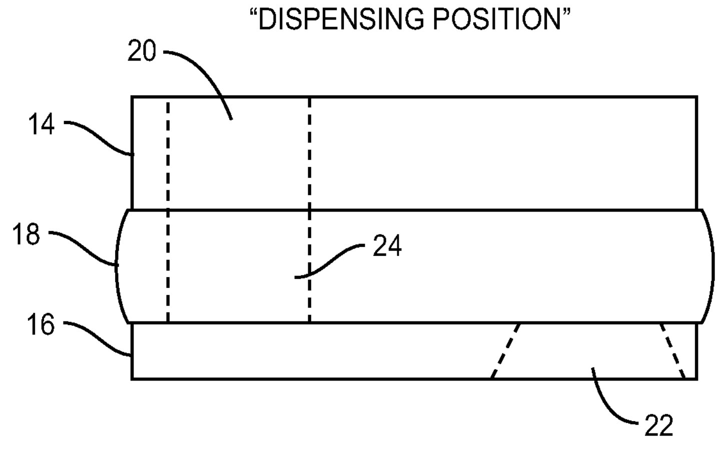
FIG. 3B illustrates the holding chamber of the assembly of FIG. 1 in a dispensing position.

The pill dispensing layer 18 is positioned between the first layer 14 and the second layer 16, and is movable with respect to the first layer 14 and the second layer 16 to dispense a pill. The pill dispensing layer 18 includes a holding chamber 24 sized to receive a pill from the entry passage 22. The holding chamber 24 is horizontally movable from between a loading position (see FIG. 3A) and a dispensing position (see FIG. 3B). In the loading position the holding chamber 24 is aligned with the entry passage 22 and is horizontally and radially offset from the exit passage 22, such that a pill may be received into the holding chamber from the entry passage 22. In the dispensing position, the holding chamber 24 is aligned with the exit passage 20 and is horizontally and radially offset from the entry passage 22, such that the pill may be dispensed via the exit passage 20. In the embodiment of FIGS. 1-3, this movement is achieved by rotation of the dispensing layer 18 about the longitudinal axis L (see, e.g., FIG. 2 which illustrates an example direction of rotation of the pill dispensing layer 18). However, this is only an example, and in other embodiments the movement between the loading and dispensing positions is not rotational. As will be discussed below, movement between the loading and dispensing positions may either monitored, controlled or both so that pill providers may detect past prescription drug abuse, and may prevent future abuse.

The assembly 10 as shown in FIGS. 1-3 is designed to allow only a single tablet to be dispensed at a time. That is, the assembly 10 is designed to allow a single pill at a time to be transferred from with the bottle 12 to the mobile holding chamber 24. A user then manipulates the holding chamber by 24 rotating the chamber from the loading position to the dispensing position. To dispense multiple pills, the assembly 10 could be controlled to simply permit multiple transitions between the loading and dispensing positions such that a single pill would be dispensed, but two pills could be dispensed in close succession. Alternatively, the assembly 10 may be designed to dispense multiple pills simultaneously. For example, the assembly 10 may include two holding chambers 24 in the dispensing layer 18, two pill entry passages 22 in the second layer 16, and two exit passages 20 in the first layer 14, such that two pills could be dispensed simultaneously.

Referring again to FIG. 1, a moisture layer 26 is positioned between the dispensing layer 18 and the second layer 16. The moisture layer 26 act as a seal (e.g. a gasket) to prevent moisture from entering the pill bottle 12 and adversely affecting pills stored in the bottle 12. The moisture layer 26 may include a guiding feature 28 (e.g. a notch) to help align the layer 26 beneath the dispensing layer 18 via a mating guiding feature 30 on the dispensing layer 18.

In the embodiment of FIG. 1, the second layer 16 is rotationally fixed with respect to the first layer 14 via an extension 32. The extension 32 passes through a central opening 34 in the dispensing layer 18 and a central opening 36 in the moisture layer 26, and is secured to an opening 38 in the second layer 16. A fastener 39 may be used to secure the extension within opening 38. As shown in FIG. 1, the extension 32, and the corresponding opening 38 in the second layer 26, have a non-circular profile (e.g. a square profile) such that the extension 32 prevents the first layer 14 from rotating with respect to the second layer 16. The openings 34, 36 may have a different or simply larger profile than that of the extension (e.g. a circular profile) to facilitate rotation of the dispensing layer 18 about the axis L.

The pill dispensing assembly 10 includes at least one fastening mechanism for attaching the assembly 10 to the pill bottle 12. In one exemplary embodiment, the fastening mechanism comprises a circumferential threading portion 40 to mate with corresponding threading portion 42 on the pill bottle 12. In the same or another embodiment, the fastening mechanism may include a zip tie 44 secured to the pill dispensing assembly 10, and sized for one-way insertion through a pill bottle receptor opening 46. The pill bottle 12 may include a plurality of such openings for convenience. A medication dispensing party (e.g. a pharmacy) may require patients to provide their previous pill bottle when providing prescription refills. Thus, if a patient had severed the zip tie 44 to access the contents of the pill bottle, the pharmacist would be able to easily detect such tampering.

As an additional example fastening mechanism, a shrink wrap or tamper proof tape seal may be used to secure the assembly 10 to the bottle 12. One or more studs 90 extending from an exterior of the assembly 10 and/or the pill bottle 12 can secure the shrink wrap or tape to the assembly 10 and the bottle 12 to prevent rotation of the assembly 10 with respect to the bottle 12. The receptors 46 can also serve as studs for securing the shrink wrap or tape. Knowing that a pharmacist would later be able to detect the absence of the shrink wrap or tape may serve to deter pill bottle tampering.

The pill dispensing assembly 10 may also include a solenoid lock 48 operable to extend through an opening 50 in the dispensing layer 18 to selectively prevent the holding chamber 24 from moving between the loading and dispensing positions at non-dosing times. The lock 48 may either reside in or extend through an opening 51 in the first layer. The lock 48 is controlled by a controller 52.

Figure 4:
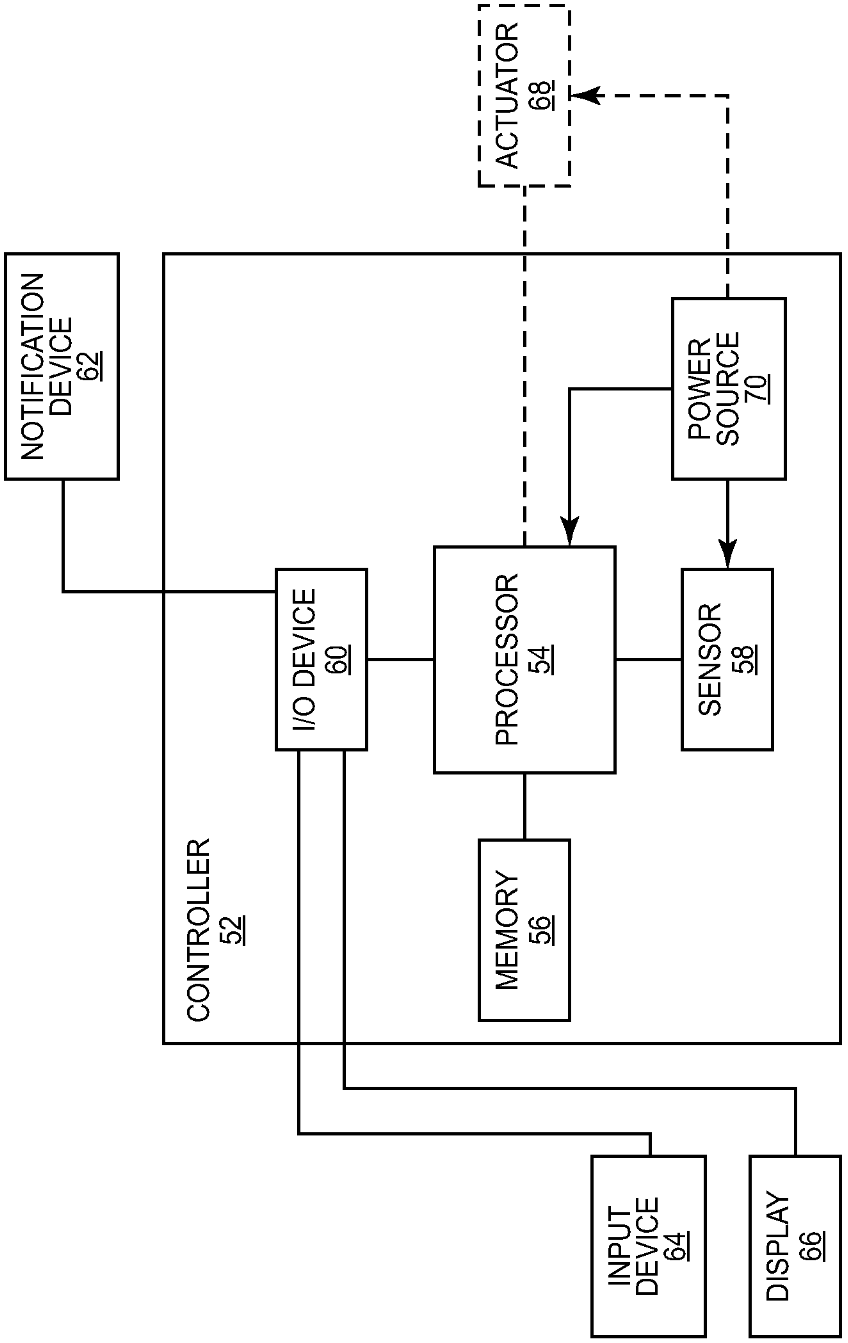
FIG. 4 schematically illustrates a controller of the assembly.

FIG. 4 schematically illustrates an example embodiment of the controller 52. As shown in FIG. 4, the controller 52 incorporates electronic components including a processor 54, memory 56, a sensor 58, and an input/output (I/O) device 60. The processor 54 receives pill detection information from the sensor 58 and records either the raw data, or information related to the raw data. For example, the processor 54 may simply record in memory 56 the time that pills exit the holding chamber 24. As another example, the processor 54 may calculate and record in memory 56 other information relating to pill dispensing, such as a time duration between subsequent pills existing the holding chamber 24 through the exit passage 24.

The processor 54 is operatively connected to the I/O device 60, which can serve as an output device to transmit recorded pill timing information and/or other pill dosing information to a remote receiver. Throughout this application, the phrase "pill dosing information" may include one or more of the following: a dosing non-compliance indication, a pharmacy ID, a pharmacist ID, a patient ID, prescribed drug information, etc. For example, the I/O device 60 may include a radio transceiver for transmitting wireless radio frequency (RF) signals to a remote receiver. Alternatively, or in addition to the transceiver, the I/O device 60 may include an output port 80 to which a pharmacist, for example, may connect a data transmission cable to download and/or upload pill timing information, and/or upload pill dosing information (see FIG. 5*a*). Thus, the I/O device 60 may be utilized by a party such as a pharmacist to determine if a patient is following a prescribed dosing schedule (i.e., is the patient dispensing the appropriate number of tables per dose and appropriate number of doses per day). The transceiver described above may be part of a passive or active Radio Frequency Identification (RFID) chip, such as a Battery Assisted Passive (BAP) tag, for example. Thus, communication with the I/O device may be performed wirelessly (e.g. RFID) or via a hardwired connection to the output port 80, for example. In one or more embodiments the processor 54 encrypts the recorded pill timing information and/or the pill dosing information that is stored in memory 56. This encryption may be performed such that only an authorized party, such as a pharmacist, would be able to decrypt the data.

The controller 52 may include software, hardware, or any combination thereof to implement these features, and those described below. The processor 54 may include an Application Specific Integrated Circuit (ASIC), a Field Programmable Gate Array (FPGA), microprocessor/microcontroller, or any other type of processing circuit.

In one embodiment, the sensor 58 is a light-based sensor that is positioned and configured to detect whether or not a pill is present in the mobile holding chamber 24 as a user of the assembly 10 manipulates the holding chamber 24 between the loading and dispensing positions. The light based sensor may also be positioned such that it can sense the location of the holding chamber 24 as it is moved to the dispensing position. The dispensing layer 18, and optionally the first and second layers 14, 16, may be composed of a clear, transparent plastic (e.g. injection molded plastic, such as polypropylene), and the top layer 14 may be painted to prevent light from being transmitted through the top layer. The light sensor could be calibrated to detect a light change corresponding to a pill entering the holding chamber 24, which could then be communicated to the processor 54 to indicate pill loading. A passage 53 in the dispensing layer 18 that is aligned with the light sensor in the dispensing position may be used to change an amount of light detected by the light sensor in the dispensing position, which could also be communicated to the processor 54 to indicate pill dispensing. Alternatively, or in addition to the light sensor, a magnet or proximity sensor could be used. Thus, in some embodiments, multiple sensors could be used.

The processor 54 may maintain an internal digital clock with date and time values. This internal clock could be initiated by a manufacturer of the dispensing assembly 10, or by a pill dispensing entity such as a pharmacy. Software executed by the processor 54 could be used to monitor the electronic signal from the sensor 58 to determine whether a pill is present and when a tablet is dispensed. Each of these events would trigger the software to save a value indicating whether a pill was present in the holding chamber and the associated time and date stamp into internal memory 56. This process is repeated for each pill dispensed for the bottle 12. The electronic components of the controller 52 would then allow the contents of the memory 56 to be downloaded for review in human readable form.

Figure 5A:
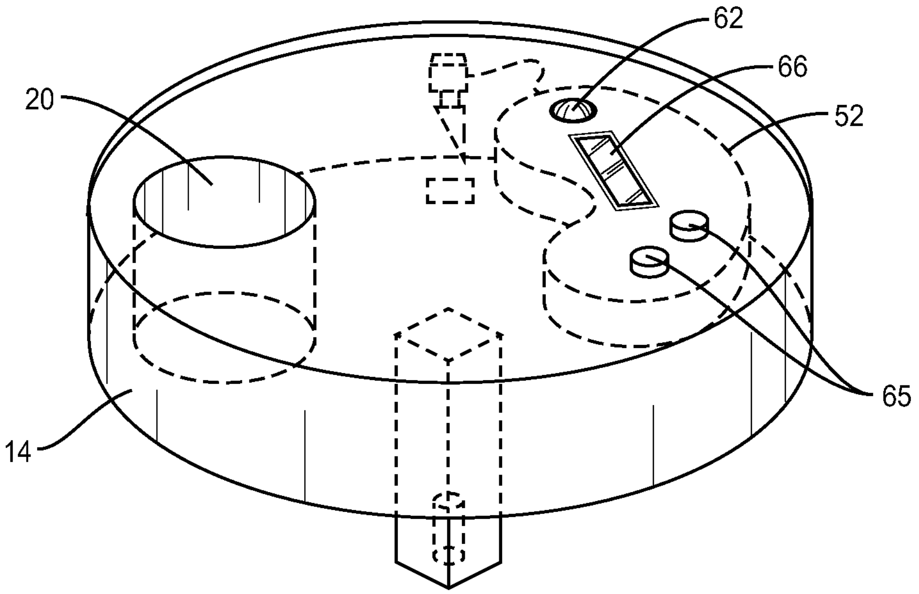
FIGS. 5A-B illustrate example embodiments of a first layer of the assembly of FIG. 1.

The processor 54 may also be operatively connected to a notification device 62 to provide a patient notification, such as the arrival of a dosage time, or a predefined amount of time passing after a suggested dosing time (see, e.g., FIG. 5A). The notification device 62 may include, for example, a vibrating transducer, a light (e.g. a light emitting diode "LED"), or a sound-emitting device configured to provide a notification at a dosing time.

The processor 54 may also be operatively connected to an additional input device 64 and a display 66. The additional input device 64 may include buttons 65 for example (see FIG. 1), to allow the loader of tablets (e.g. a pharmacy) to store a pill dosing schedule in the memory 56. The controller 52 may utilize the programmed dosage data programmed by the loader above to lock and unlock a mechanical lock mechanism (e.g. solenoid 48), such that movement between the loading and dispensing positions is only permitted at allowed dosing times. To control the lock mechanism, the controller 52 may be operatively connected to an actuator 68. The input device 64 may include a fingerprint sensor 67 in communication with the controller 52. The fingerprint sensor 67 may be used for patient identification (e.g. to record a fingerprint of who is accessing the contents of a pill bottle), and/or may be used in connection with a lock such as the solenoid lock 48, such that the lock would only be disengaged by the controller 52 if an appropriate dosing time had arrived and an acceptable fingerprint was received via the fingerprint sensor 67 (e.g. that of a patient or caregiver).

A fingerprint received via sensor 67 may be compared to one or more saved fingerprints stored in memory 56. In one example, the one or more saved fingerprints are not entire fingerprints, but instead include only a few unique attributes of accepted fingerprints, to reduce memory 56 storage requirements. The memory 56 may also store encrypted and/or unencrypted personal information about a patient, including some of the pill dosing information discussed above (e.g. a photo identification number or another personal identifier, pharmacy ID, pharmacist ID, etc.). Thus, with or without being used for locking features, the fingerprint sensor 67 could be used simply to identify a patient and record a positive patient confirmation.

A power source 70 (e.g. a battery) may be used to power the processor 54, sensor 58, and actuator 68, and although not shown in FIG. 4 may also be used to power notification device 62, input device 64, and display 66 as needed.

Figure 5B:
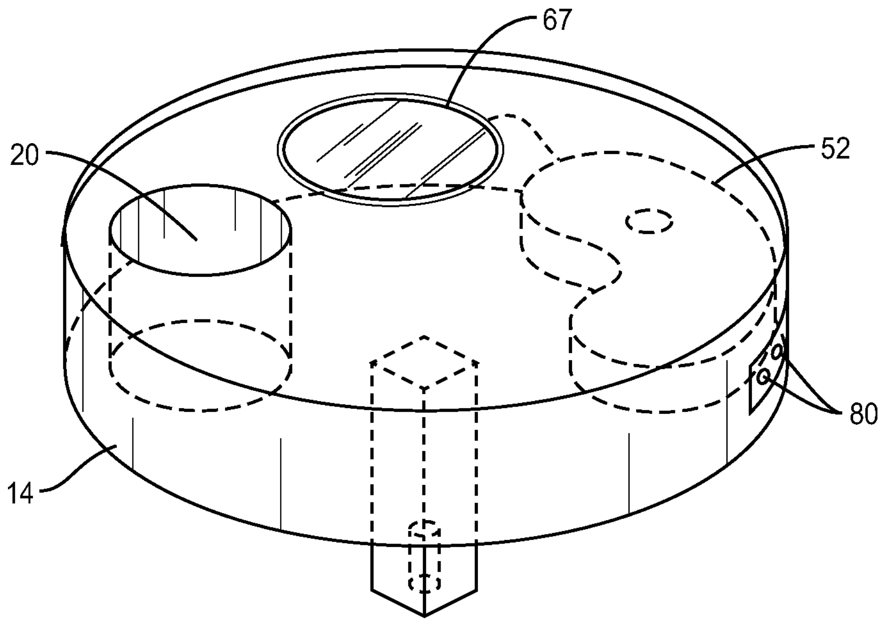

The display 66 may be used to indicate dosing information to either a patient or caregiver (e.g. remaining time until next dose), or to a loader of tablets (e.g. an indicator of tampering or variance from the dosing schedule). For example, the display could display the time remaining until a subsequent dose and/or a time of a last dose. As shown in FIG. 5*b*, the display 66 may be located on an exterior of the first layer 14. However, this is only an example, and the display 66 could alternatively be located on an exterior of the second layer 16 or the dispensing layer 18. The display 66 may include a liquid crystal display (LCD), for example. Thus, the display 66 may also be used as a notification device as described above.

Figure 6:
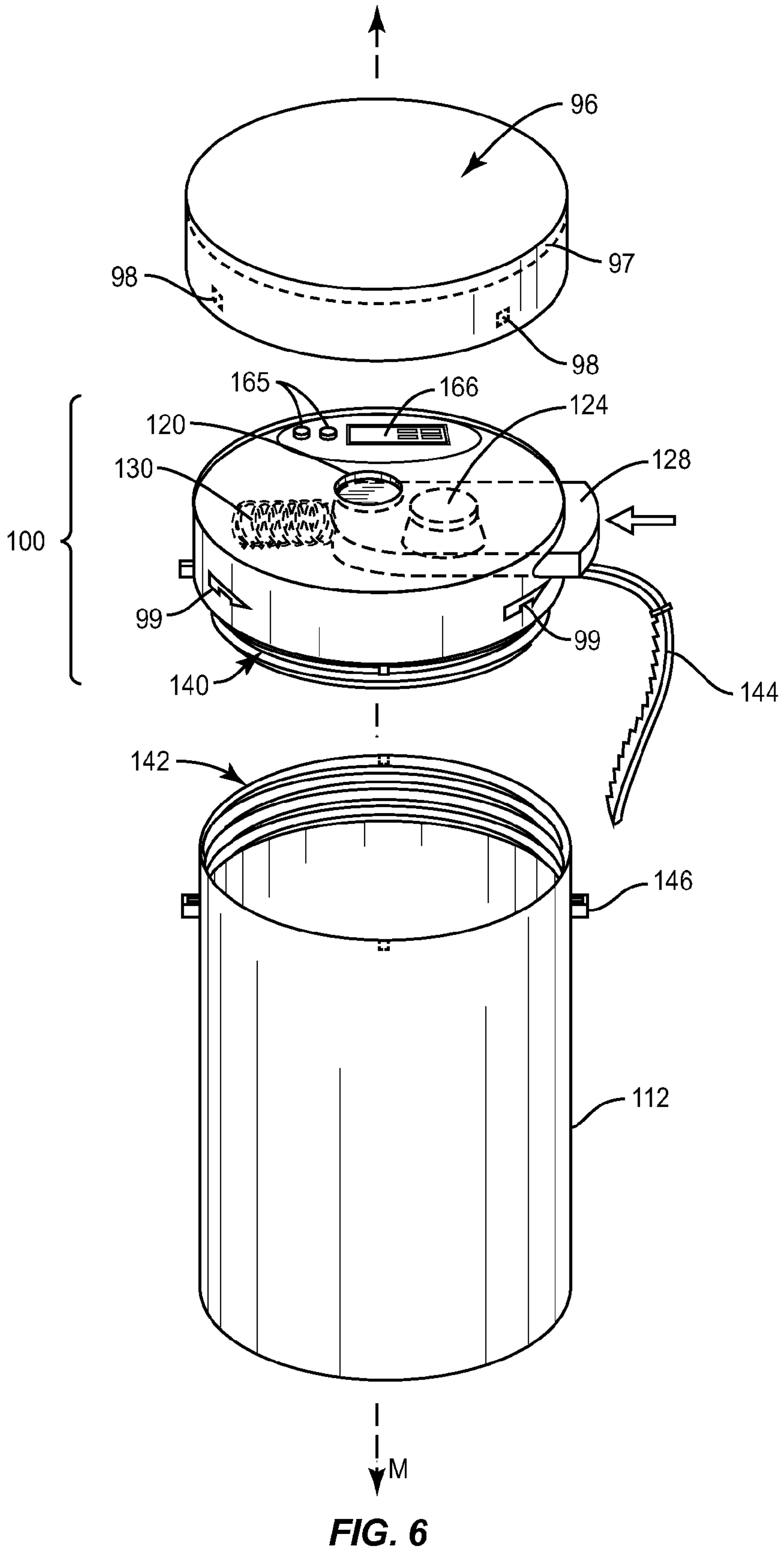
FIG. 6 illustrates another exemplary pill dispensing assembly.
Figure 7A:
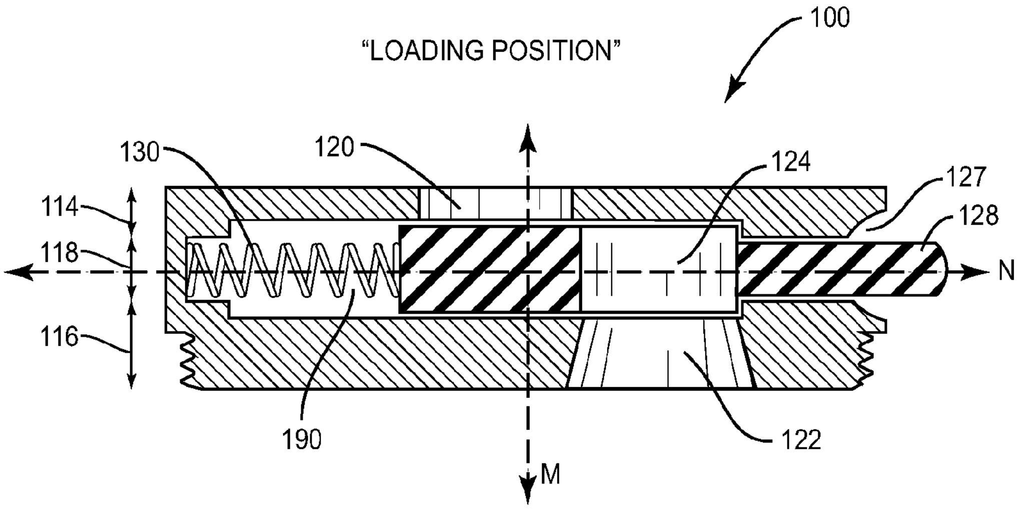
FIG. 7A illustrates the holding chamber of the assembly of FIG. 6 in a loading position.
Figure 7B:
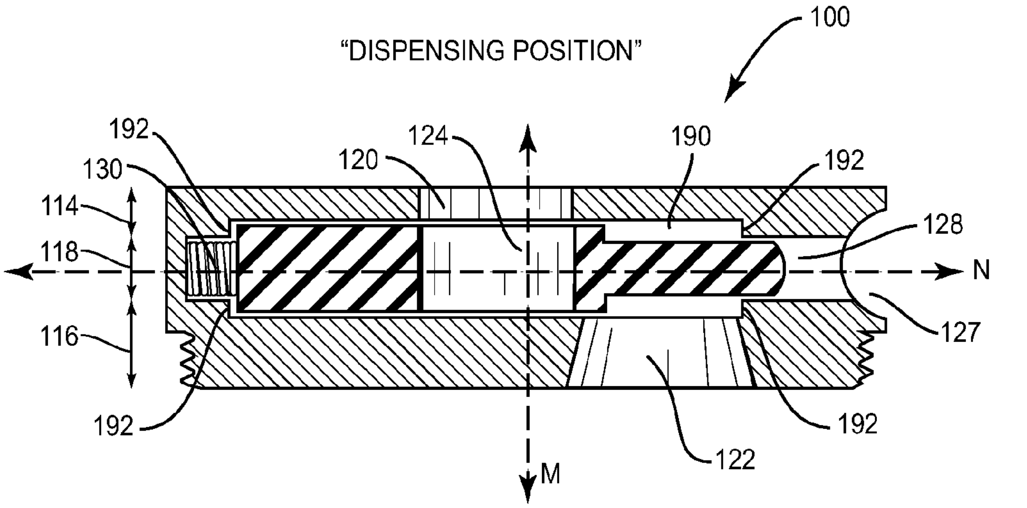
FIG. 7B illustrates the holding chamber of the assembly of FIG. 6 in a dispensing position.

FIG. 6 illustrates an example pill dispensing assembly 100 in which movement of the holding chamber between the loading and dispensing positions is a sliding horizontal movement instead of a rotational movement. The assembly 100 includes a first layer 114, second layer 116 and dispensing layer 118. The first layer 114 includes a pill exit passage 120, and the second layer 116 includes a pill entry passage 122. The pill dispensing assembly 100 extends along a longitudinal first axis M. In this embodiment, the holding chamber 124 is defined by a transport shuttle 128 that is movable within the pill dispensing assembly 100 along a second axis N that is transverse to the first axis M, between a loading position (see FIG. 7A) and a dispensing position (see FIG. 7B). The transport shuttle 128 is biased away from the dispensing position by a bias member 130 (e.g. a coil spring or a leaf spring) within the pill dispensing assembly 100. A range of motion of the transport shuttle may be defined by a stepped portions 192 within a transport shuttle chamber 190. By sliding the transport shuttle 128 along the axis N, a user may transition the assembly 100 from the default loading position to the dispensing position. Movement of the transport shuttle 128 may be performed, for example, by pushing the transport shuttle 128 from the side of the assembly 100 (see FIGS. 7A-B). Of course this is only an example, and it would also be possible to arrange the transport shuttle 128 to be biased towards the dispensing position, such that a pulling of the transport shuttle 128 would be required to load a pill, and then releasing the transport shuttle 128 would return the shuttle to the dispensing position. As shown in FIG. 7, a recess 127 may be formed in the side of the assembly 100 to facilitate user movement of the transport shuttle 128.

As in the embodiment of FIG. 1, the pill exit passage 120 and pill entry passage 122 are horizontally and axially offset from each other with respect to the longitudinal axis M, the pill entry passage 22 may have a frustoconical shape to facilitate the entry of pills into the entry passage 122, and threading portions 140, 142 and/or zip tie 144 with associated receptors 146 may be used to secure the assembly 100 to pill bottle 112. Also, as in the embodiment of FIG. 1, a display 166 may be included, and a lock and sensor may also be included. Optionally, a childproof cap 96 may be used to control access to the assembly 100.

Figure 8:
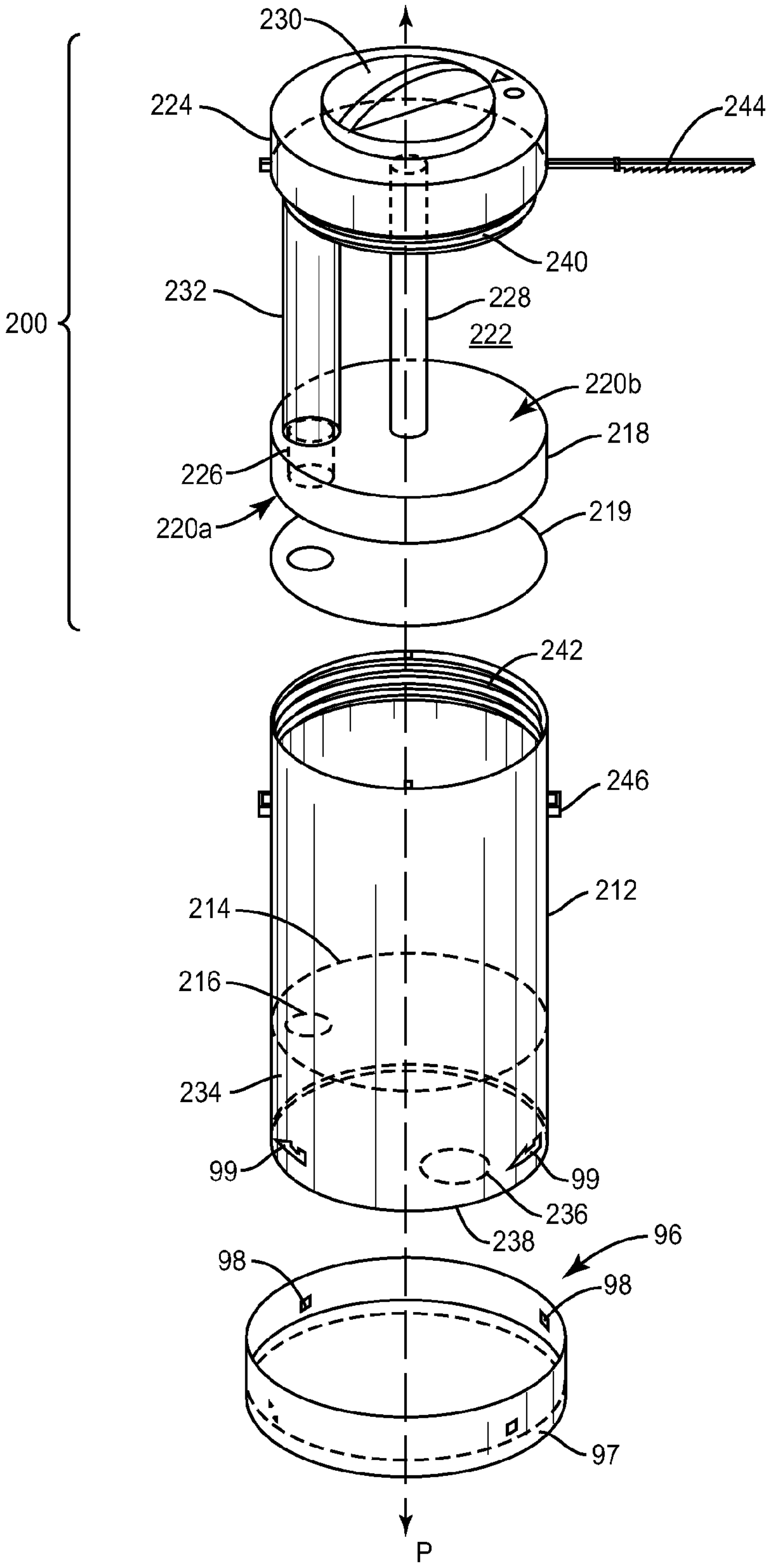
FIG. 8 illustrates another exemplary pill dispensing assembly.

FIG. 8 illustrates another exemplary pill dispensing assembly 200 for dispensing a pill from a pill bottle 212. The assembly 200 extends along a longitudinal axis P. A first layer 214 of the assembly includes a pill exit passage 216. A pill dispensing layer 218 is axially aligned with and rotatable with respect to the first layer 216. A first side 220*a* of the dispensing layer 218 faces the first layer 214, and an opposite second side 220*b* of the dispensing layer 218 faces a pill storage area 222. The pill storage area 222 is defined at one end by the second side 220*b* of the dispensing layer 218, and at a second end by a second layer 224. The pill dispensing layer 218 includes a holding chamber 226 sized to receive a pill from the storage area 222. Optionally, a moisture layer 219 may be situated between the first side 22*a* and the first layer 214 to prevent moisture from entering the pill storage area 222.

Figure 9A:
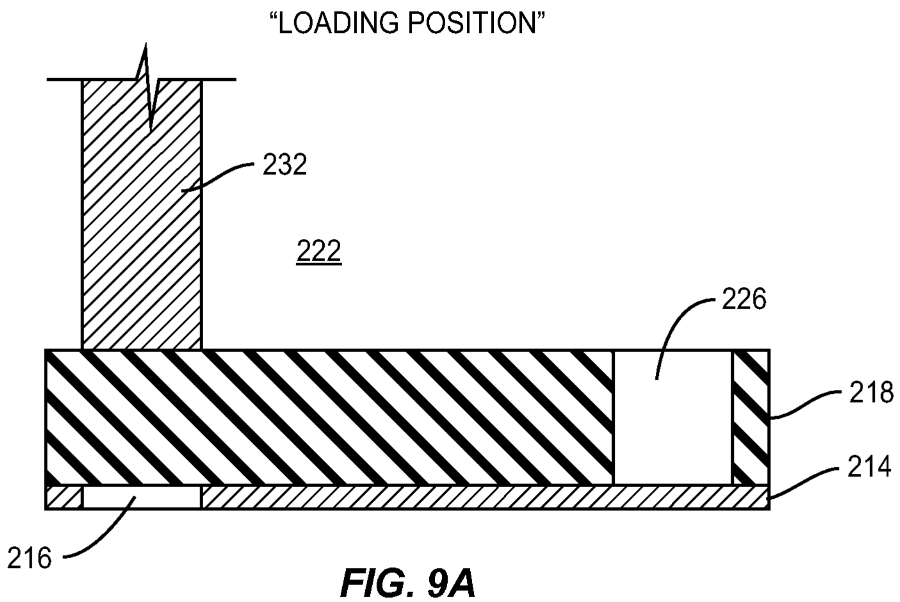
FIG. 9A illustrates the holding chamber of the assembly of FIG. 8 in a loading position.
Figure 9B:
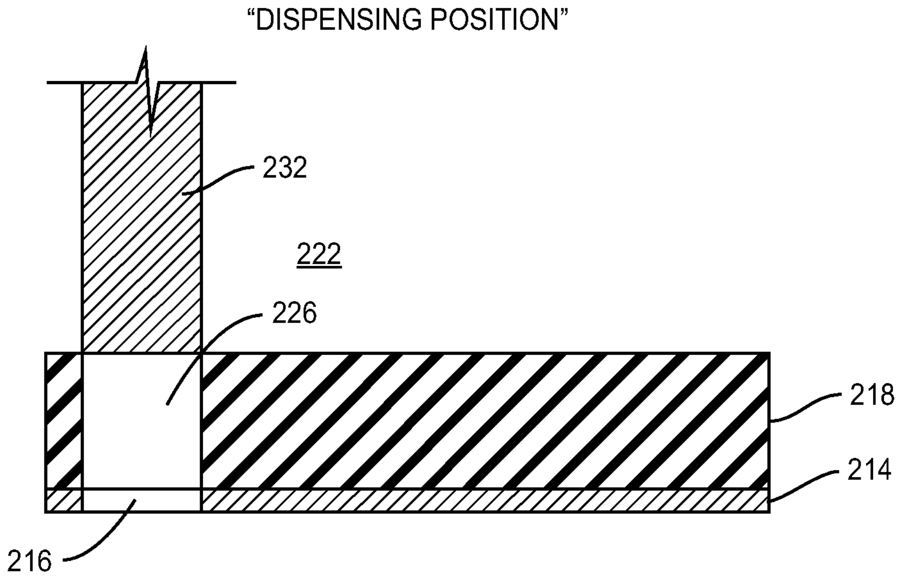
FIG. 9B illustrates the holding chamber of the assembly of FIG. 8 in a dispensing position.

A driveshaft 228 extending from the second layer 224 is configured to rotate the pill dispensing layer 218 from a loading position in which the holding chamber 226 is exposed to the storage area 22 to receive the pill from the storage area 222 (see FIG. 9A), to a dispensing position in which the holding chamber 226 is aligned with the exit passage 216 to dispense the pill through the exit passage (see FIG. 9B). A timer 230 is configured to control rotation of the pill dispensing layer 218 between the loading and dispensing positions. The timer 230 may comprise a digital timer controlling an electric drive actuator to rotate the drive shaft 228, or alternatively may comprise a spring-loaded rotary drive could be used to rotate the drive shaft 228, for example.

A blocking member 232 is aligned with the exit passage 216, and is sized to prevent a pill from entering the holding chamber 226 from the storage area 222 when the pill dispensing layer 218 is in the dispensing position. Once a pill exits through the exit passage 216, the pill enters a dispensing area 234 of the pill bottle 212, from which the pill may pass through a hole 236 in a bottom 238 of the pill bottle 212. Thus, unlike the other embodiments, in which pill dispensing is more easily performed with the bottle inverted, the assembly 200 can be used easily in an upright position.

The timer 230 is configured to control rotation of the pill dispensing layer 218 such that a duration of time of the rotation between the loading and dispensing positions corresponds to a patient dosing schedule. The timer may be configured to only permit rotation of the dispensing layer 218 if the timer dial is turned all the way back to a starting position (see, e.g., circle shape on layer 224). Thus, in the example of FIG. 8 this would be counter-clockwise rotation. The timer 230 would then rotate the driveshaft 228 so that the holding chamber 226 moves from the loading to the dispensing position (see, e.g., the triangle shape on layer 224). As in the embodiment of FIG. 1, and threading portions 240, 242 and/or zip tie 244 with associated receptors 246 may be used to secure the assembly 100 to pill bottle 112. Optionally, a childproof cap 96 may be used to control access to the assembly bottom 238 of the pill bottle 212.

Figure 10:
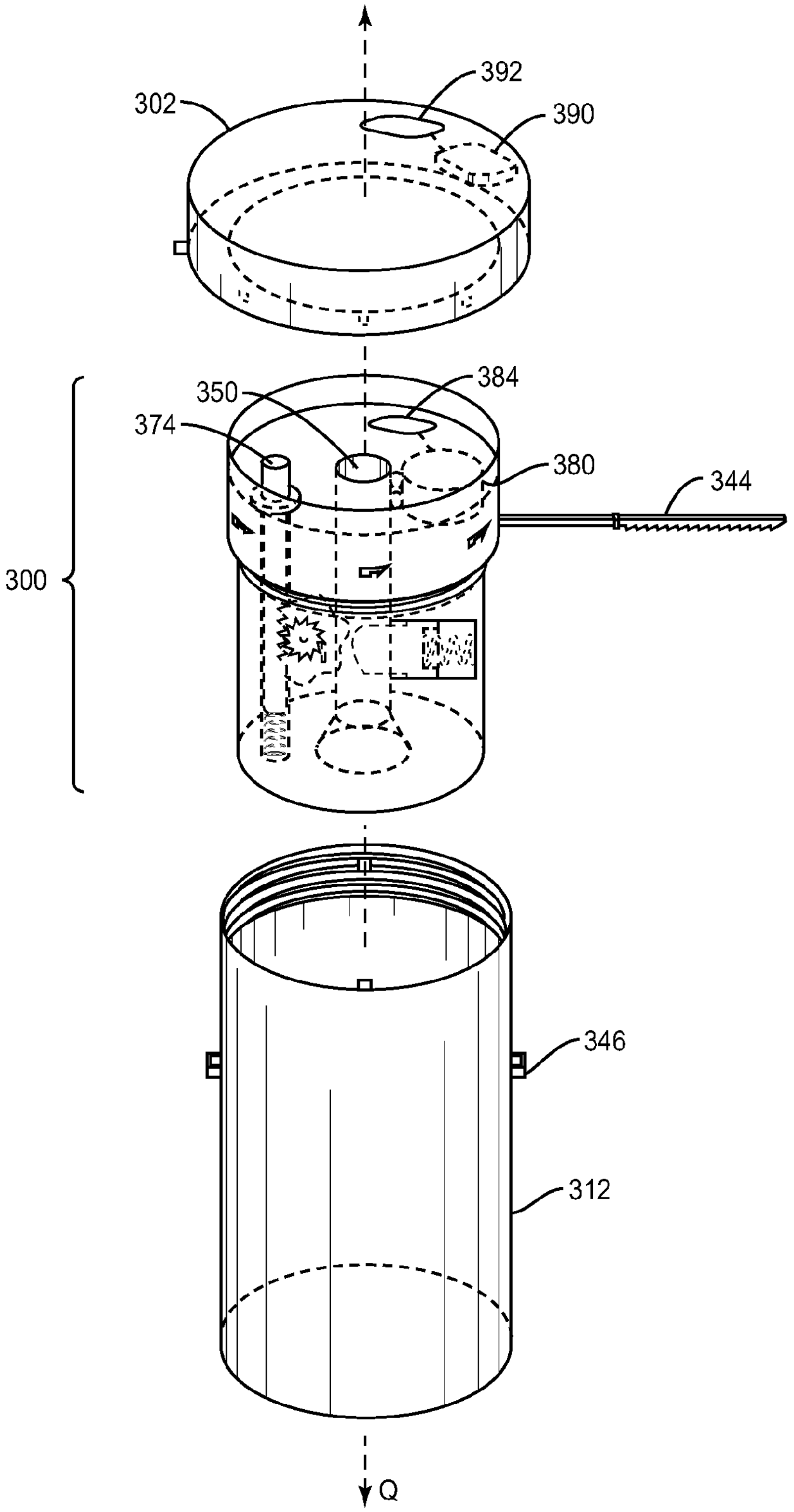
FIG. 10 illustrates another exemplary pill dispensing assembly.
Figure 11:
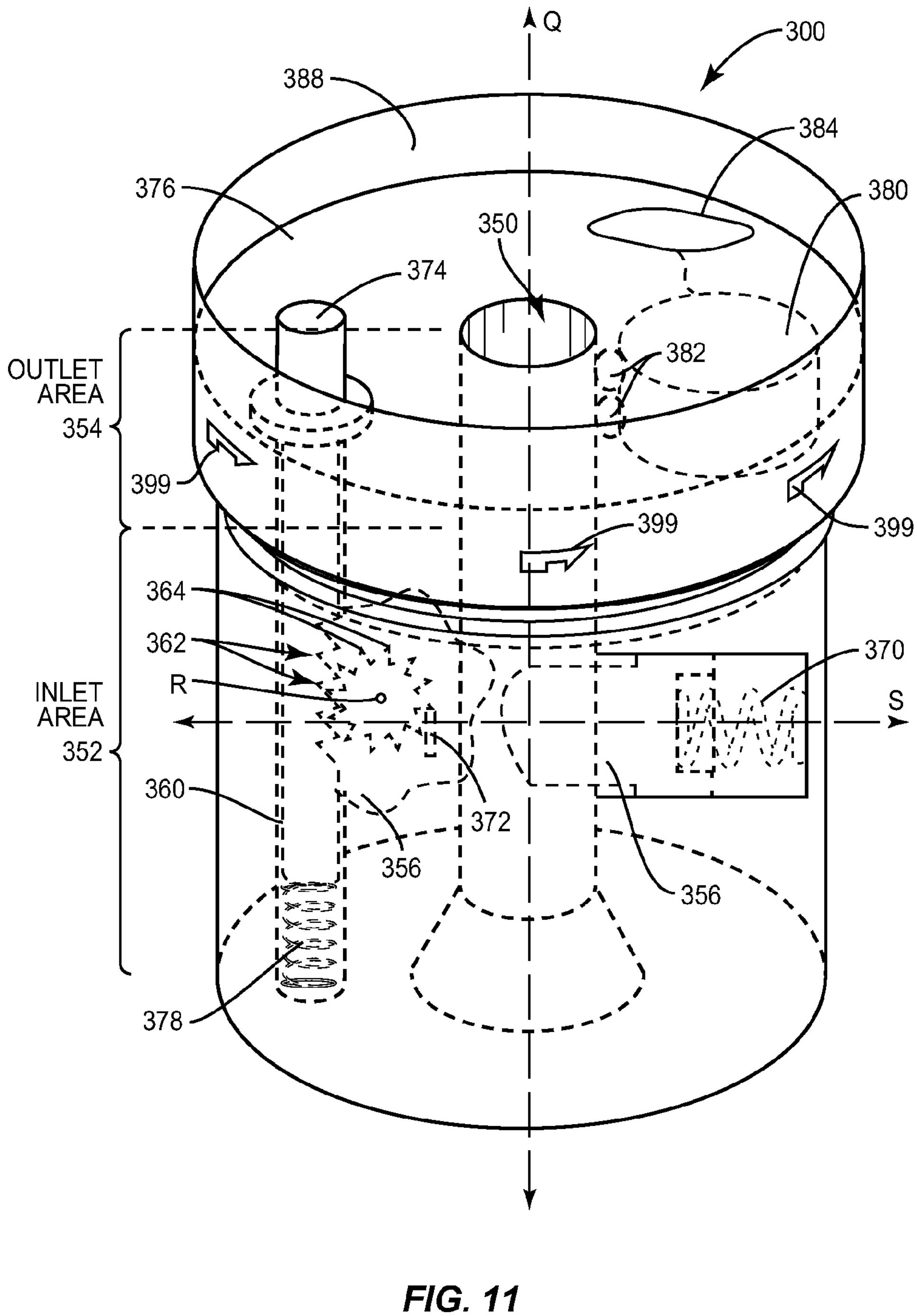
FIG. 11 illustrates an enlarged view of the assembly of FIG. 10.

FIGS. 10-11 illustrate yet another exemplary pill dispensing assembly 300. The assembly 300 extends along a longitudinal axis Q, and may be received into pill bottle 312 to dispense pills from the bottle 312. The assembly 300 includes a pill dispensing passage 350 that extends through the assembly along the Q axis and includes an inlet area 352 and an opposing outlet area 354 that are aligned along the axis Q (see FIG. 11). Optionally, a portion of the inlet area 352 may have a frustoconical shape to facilitate the entry of pills into the inlet area 352 with greater ease. A catch member 356 extends at least partially into the inlet area 352 of the pill dispensing passage 350 from a first side. The catch member 356 is rotatable about a second axis R (seen coming out of the page at point R in FIG. 11). The axis R is transverse to the axis Q. A contact member 358 is biased into the inlet area 352 of the pill dispensing passage 350 from an opposing second side of the passage 350.

An elongated plunger 360 is spaced away from the passage 350, and includes a first plurality of teeth 362 sized to engage a second plurality of teeth 364 on the catch member 356 to effect rotation of the catch member 356 about the axis R, such that depression of the plunger 360 in a first direction (downwards along axis Q in FIGS. 10-11) engages a pill between the catch member 366 and the contact member 368, and advances the pill from the inlet area 352 to the outlet area 354 in an opposite second direction (upwards along axis Q in FIGS. 10-11). In effecting this movement, the contact member 358 (which is biased towards the catch member 356 by a bias member 370), is moved along an axis S that is transverse to the axes Q and R. This movement compresses the bias member 370 to move the contact member 358 away from the catch member 356. The axes Q, R and S may be perpendicular to each other. A catch element 372 engages the teeth 364 to only permit rotation of the catch member 356 in a single direction (counter-clockwise in the example of FIGS. 10-11). The plunger 360 may be depressed by pressing a portion 374 of the plunger that extends above a top 376 of the assembly 300. The plunger 360 is biased upwards towards the top 376 of the assembly 376 by a bias member 378.

The assembly 300 may include a controller 380 similar to the controller 52 of FIG. 4. The controller 380 may include a light sensor (see sensing elements 382) operable to sense a pill in the outlet area 354. The controller 380 may use data from the light sensor to record the time that a pill exits the outlet area 354 through a terminal end of the pill dispensing passage 350. Optionally, a fingerprint sensor 384 may be included on the top 376 of the assembly 300, and may be used as in the other embodiments for patient identification. As in the embodiment of FIG. 1, a zip tie 344 with associated receptors 346 on pill bottle 312 may be used to secure the assembly 300 to pill bottle 312.

Figure 12:
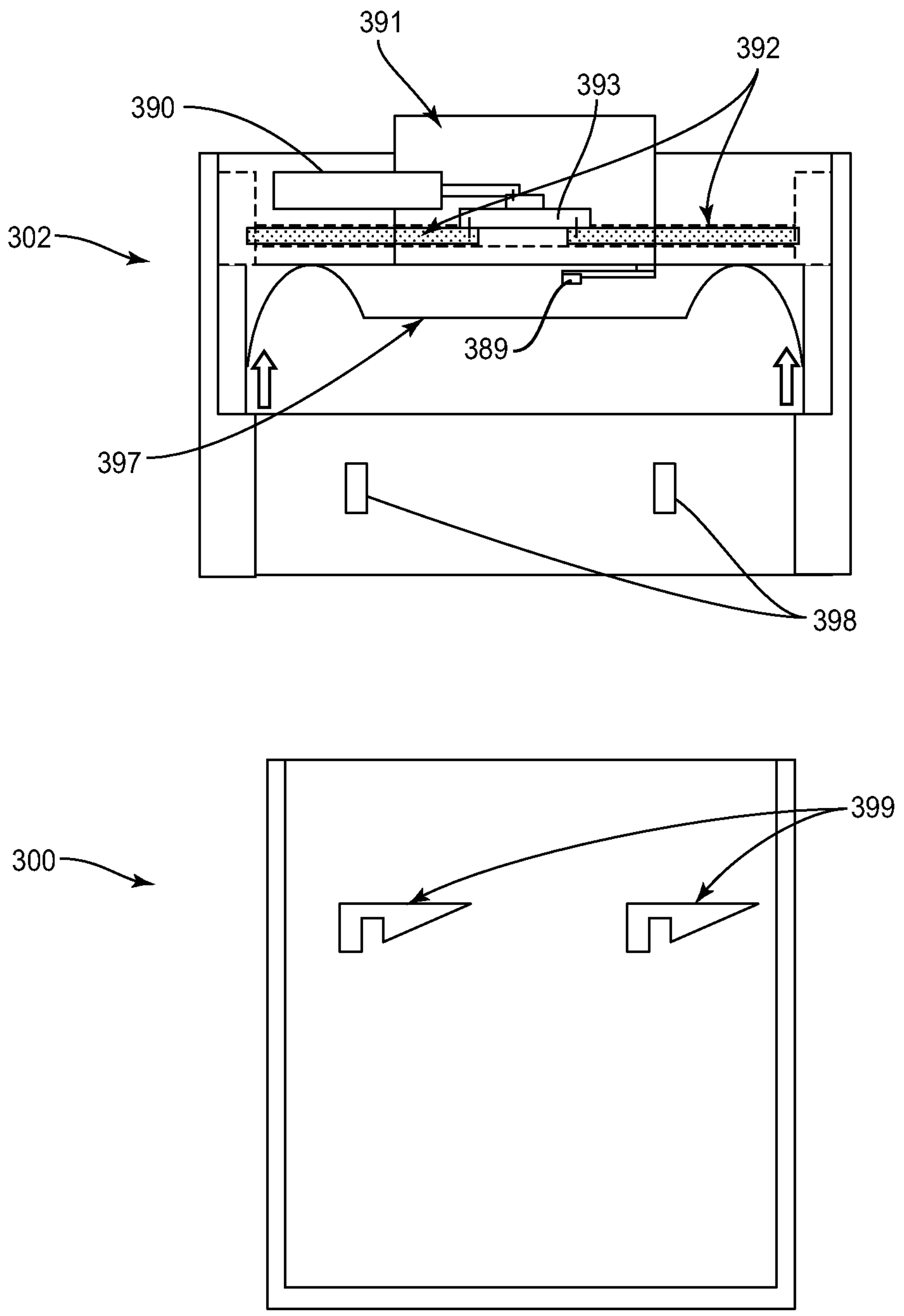
FIG. 12 illustrates an exemplary childproof cap including locking features.

Referring again to FIG. 11, a cap 302 (optionally a childproof cap similar or identical to the cap 96 of FIG. 1) may be securable to the assembly 300 or the pill bottle 312, to extend over and conceal the outlet area 354 of the pill dispensing passage 350. FIG. 12 illustrates an example childproof cap that may be used in connection with any of the assemblies 100, 200, 300. As shown in FIG. 12, the cap 302 may include a controller 390 (e.g. a solenoid) in operative communication with a fingerprint sensor 391. The controller 390 may be configured actuate a lock to secure the cap 302 to the assembly 300 (or alternatively to bottle 312) via standard childproof lock pins 398 and corresponding childproof lock members 399. This locking prevents access to the outlet area 354 unless an authorized fingerprint is detected by the fingerprint sensor 391, unless a predefined dosing time has arrived, or both.

The controller 390 is operable to move locking members 392 (or "extensions") to lock or unlock the members 392, and to correspondingly allow or prevent rotation of the bottle cap 302. The locking members 392 may function in a fashion similar to that of a clicking pen, such that power is only required to transition between the locked and unlocked positions, and is not required continuously to maintain the members 392 in either position.

The locking may be triggered when a sensor 389 is contacted by a flexible sealing diaphragm. In addition to serving as a moisture seal, the diaphragm 397 is movable to compress the sensor 389, which notifies the cap 302 that it has been secured to one of the assemblies 100, 200, 300 or a pill bottle. This movement may occur when either the circumference of a pill bottle or a lip on top of one of the assemblies (e.g. lip 388 on top of assembly 300) engages the diaphragm along the arrows of FIG. 12, which causes the diaphragm 397 to flex and contact the sensor 389. Unlocking may then be achieved via a fingerprint sensor, or via a timed release performed by controller 390, for example.

Figure 13A:
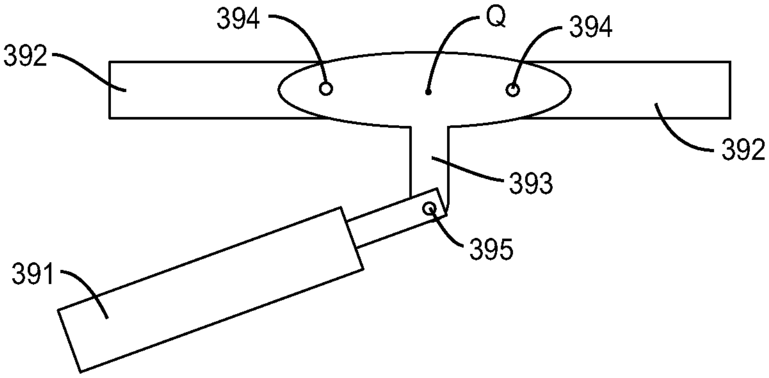
FIGS. 13A-B illustrate locking members of the configuration of FIG. 12 in a locked position and an unlocked position.
Figure 13B:
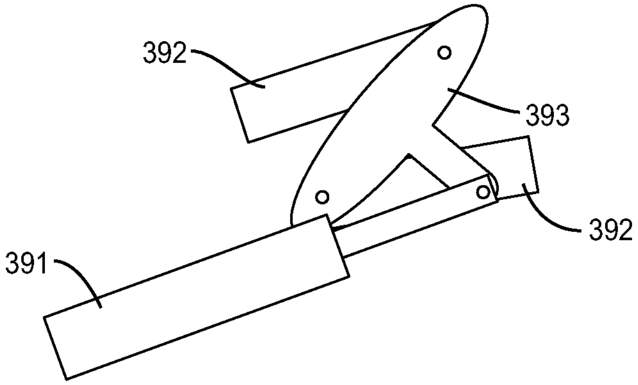

FIGS. 13A-B illustrate the members 392 in a locked position and an unlocked position as viewed with axis Q coming out of the page. A pivot member 393 is secured to the locking members 392 by pivot points 394, and is secured to controller 391 by pivot point 395. By rotating the pivot member 393, the locking members 392 may be either locked or unlocked.

Thus, the various embodiments of pill dispensing assemblies provide a number of benefits. One such benefit is providing the ability to control the dispensing of medication to users. Another benefit is to record pill dispensing data to provide pill providers (e.g. pharmacies and/or doctors) with information indicating whether patients adhere to prescribed dosing schedules. If this information is shared between pill providers (e.g. shared between pharmacies), then patients could be prevented from engaging in Medicare fraud by repeatedly filling the same prescription at multiple pharmacies. The various thumbprint sensors can also be used to prevent fraud by performing identity checks using stored fingerprints, to ensure that those filling or picking up prescriptions are not misrepresenting themselves.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A pill dispensing, assembly for dispensing a pill from a pill bottle, comprising:

a first layer including a first surface and a second surface, an extension engaged to and centrally positioned on said first surface, and a pill exit passage through which said pill becomes accessible to the user;

a second layer including a central opening for receiving the extension whereby engagement of first layer and second layer through extension prevents rotation of first layer with respect to second layer so that the entire second layer is fixed, and a pill entry passage that is offset from the exit passage; and a pill dispensing layer positioned between the first and second layers and rotationally movable with respect to the pill bottle and first and second layers during a typical dispensing operation by a user, the pill dispensing layer comprising a central opening for receiving the extension whereby engagement of first layer and pill dispensing layer through extension promotes rotational movement of pill dispensing layer, and a holding chamber sized to receive the pill, the holding chamber being rotationally movable from a first loading position in which the holding chamber is aligned with the entry passage and is offset from the exit passage to receive the pill, to a second dispensing, position in which the holding chamber is aligned with the exit passage and is offset from the entry passage to dispense the pill through the exit passage; and a controller configured to sense alignment of said holding chamber with said said exit passage and to record the time that the pill is dispensed.

2. The pill dispensing assembly of claim 1, further comprising at least one sensor configured to sense alignment of said holding chamber with said exit passage.

3. The pill dispensing assembly of claim 2, wherein said at least one sensor is positioned substantially remote from said pill exit passage.

4. The pill dispensing assembly of claim 1, further comprising at least one sensor configured to sense the presence of a pill in the holding chamber.

5. The pill dispensing assembly of claim 1, wherein the controller is further configured to determine a time duration between subsequent pills exiting the holding chamber through the exit passage.

6. The pill dispensing assembly of claim 1, wherein the controller is operatively connected to an output device and is configured to transmit recorded pill timing data via the output device to a remote receiver, the output device comprising a radio transceiver, a data output port sized to receive a data transmission cable, or both.

7. The pill dispensing assembly of claim 6, wherein the output device comprises a radio transceiver that is configured to wirelessly receive prescription-related data.

8. The pill dispensing, assembly of claim 1, further comprising a solenoid lock operable to extend into the dispensing layer to selectively prevent the holding chamber from moving between the loading and dispensing positions.

9. The pill dispensing assembly of claim 1, wherein the pill dispensing layer is rotatable about an axis extending through the first and second layers to effect movement of the holding chamber between the loading and dispensing positions.

10. The pill dispensing assembly of claim 1, wherein the first layer, the second layer, and the pill dispensing layer are coaxial about a longitudinal axis.

11. The pill dispensing assembly of claim 1, wherein the pill dispensing assembly further comprises at least one fastening mechanism for attaching the first and second layers to a pill bottle.

12. The pill dispensing assembly of claim 11, wherein the fastening mechanism comprises at least one of a circumferential threading portion to mate with corresponding threading portion on the pill bottle, and a zip tie secured to the pill dispensing assembly and sized for insertion through a pill bottle opening.

13. The pill dispensing assembly of claim 1, further comprising an electronic display on an exterior of at least one of the first layer, the second layer, and the dispensing layer, the electronic display being configured to display at least one of pill dosing information and pill dispensing timing information.

14. The pill dispensing assembly of claim 1, further comprising a controller in communication with a fingerprint sensor, the controller being configured to prevent movement of the holding chamber from the loading position to the dispensing position unless an authorized fingerprint is detected by the fingerprint sensor.

15. The pill dispensing assembly of claim 1, further comprising a vibration mechanism configured to vibrate the pill dispensing assembly at predefined dosing times.

* * * * *